United States Patent
Lai

(12) United States Patent     (10) Patent No.: US 6,988,904 B1
(45) Date of Patent: Jan. 24, 2006

(54) PUSH-PUSH CARD CONNECTOR

(75) Inventor: Yaw-Huey Lai, Taipei (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/003,517

(22) Filed: Dec. 6, 2004

(30) Foreign Application Priority Data

Oct. 20, 2004 (TW) .............. 93131909 A

(51) Int. Cl.
*H01R 13/62* (2006.01)
(52) U.S. Cl. .................................... 439/159
(58) Field of Classification Search ........... 439/159, 439/160, 946, 630, 152; 361/756
See application file for complete search history.

(56) References Cited

U.S. PATENT DOCUMENTS 6,629,860 B1 * 10/2003 Hu et al. ............. 439/607
6,786,410 B2 * 9/2004 Kihara ................. 235/453
2005/0106944 A1 * 5/2005 Kuo .................... 439/630

* cited by examiner

*Primary Examiner*—Tho D. Ta
*Assistant Examiner*—Vanessa Girardi
(74) *Attorney, Agent, or Firm*—Bacon & Thomas PLLC

(57) ABSTRACT

A push—push card connector includes a terminal connector, a cover shell, a slidable frame, an injecting/ejecting means, and an elastic member. The slidable frame is slidably received in a lateral guide channel, a first guide channel, and a second guide channel, which are formed respectively at bilateral sides of the cover shell via a lateral guide member thereof, a first guide member thereof, and a second guide member thereof for slidable movement along the guide channels by an external force. The lateral guide channel and member are close to an imaginary middle line, which is defined to extend through a front end, a center, and a rear of the slidable frame, and the elastic member generates resilience working on the second guide channel. Thus, the slidable frame is not subject to deflection during injection/ejection of a card to facilitate smooth operation.

6 Claims, 6 Drawing Sheets

PUSH-PUSH CARD CONNECTOR

BACKGROUND OF THE INVENTION

1. Field of the Invention

The present invention relates generally to electronic devices, and more particularly to a push—push card connector.

2. Description of the Related Art

A conventional card connector, such as SD (Secure digital) card connector or all-in-one card connector, is generally additionally provided with an injecting/ejecting means for facilitating injecting/ejecting an inserted electronic card by the user. Such injecting/ejecting means has been widely disclosed in many patents, generally having a heart-shaped slot, a positioning member, and a spring to be structurally similar in each of the patents.

Since the conventional injecting/ejecting means is commonly mounted at a side of the card connector, where the spring works or the card is worked is one single side during operation. If working on a relatively narrower elongated card, the injecting/ejecting means may still do it tolerably. However, if working on a relatively broader card, like XD (extreme digital) card or EXPRESS card, the injecting/ejecting means tens to deflect the card to further jam or damage the card while injecting/ejecting the card.

SUMMARY OF THE INVENTION

The primary objective of the present invention is to provide a push—push card connector, which prevents an inserted card from deflection that may damage the card while injecting/ejecting the card.

The foregoing objective of the present invention is attained by the push—push card connector, which is comprised of a terminal connector, a cover shell, a slidable frame, an injecting/ejecting means, and an elastic member. The terminal connector includes a plurality of contact pins. The cover shell includes a lateral guide channel formed at a side thereof, a first guide channel formed at a front section of an opposite side thereof, and a second guide channel formed at a rear section of the opposite side thereof. The distance between the lateral guide channel and the first guide channel being larger than that between the lateral guide channel and the second guide channel. The cover shell has a rear end connected with the terminal connector. The slidable frame includes a lateral guide member slidably received in the lateral guide channel, a first guide member slidably received in the first guide channel, a second guide channel slidably received in the second guide channel, and at least one action piece provided at a rear end thereof for pushing by an inserted card to slidably move toward the rear end of the cover shell, for slidable movement along the guide channels by an external force. A receiving space is defined between the slidable frame and the cover shell for inserting and receiving a card therein. The injecting/ejecting means includes a heart-shaped guide slot and a positioning member. The guide slot is formed on one of the guide members of the slidable frame. The positioning member has two ends respectively located on one of the guide channels of the cover shell and in the guide slot. An elastic member includes two ends respectively mounted to the cover shell and the second guide member for generating resilience that ejects the slidable frame.

DETAILED DESCRIPTION OF PREFERRED EMBODIMENTS

Figure 1:
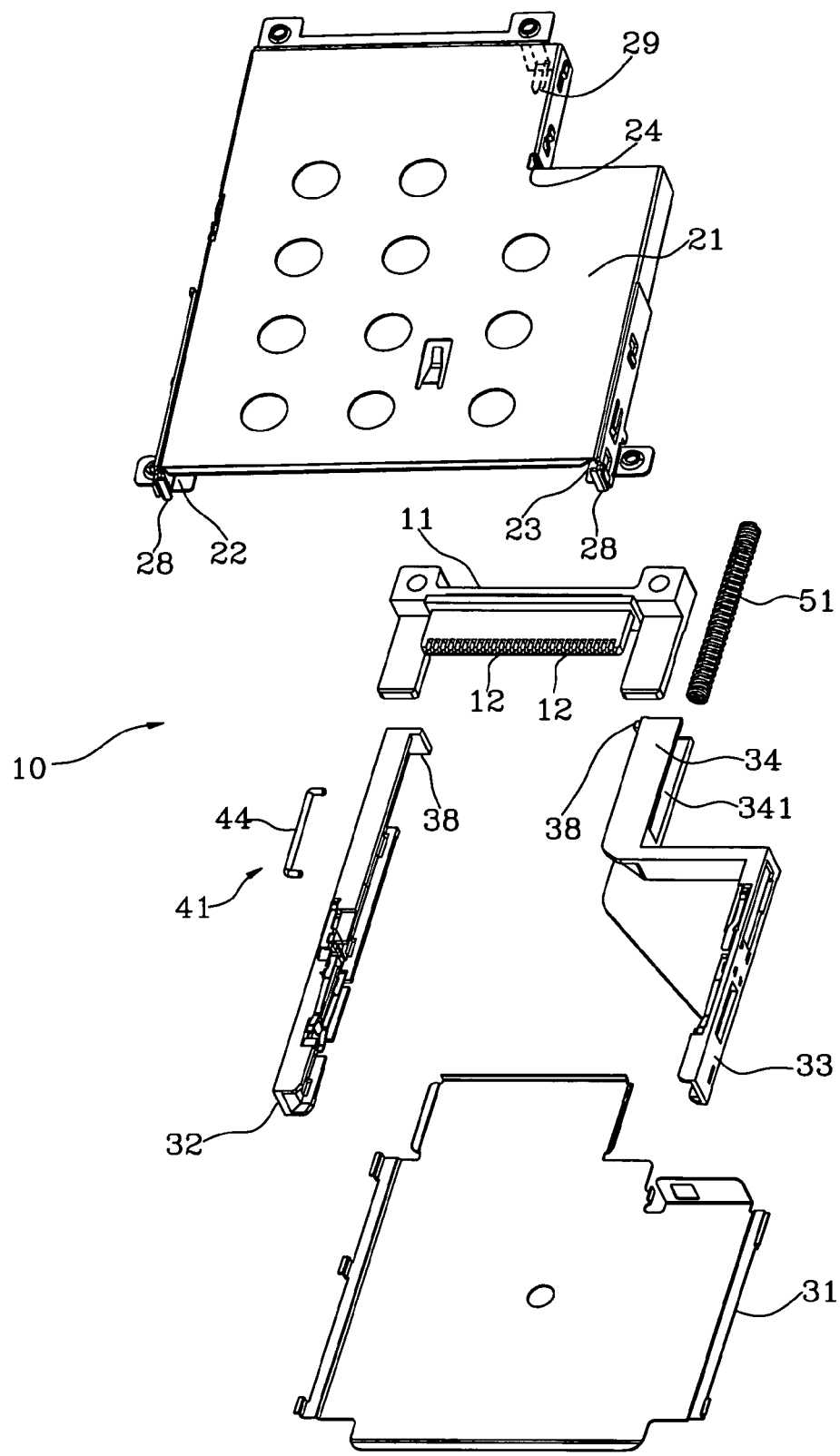
FIG. 1 is an exploded view of a preferred embodiment of the present invention.
Figure 2:
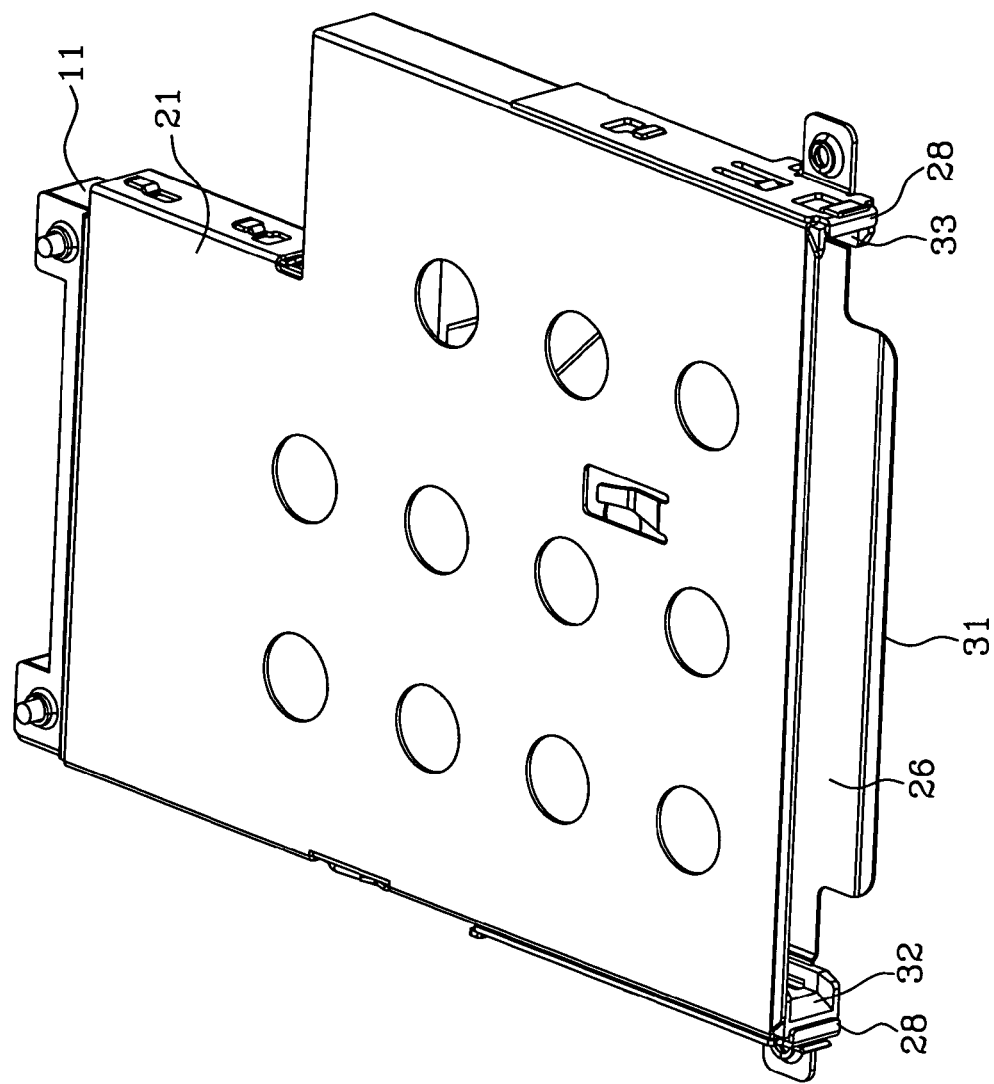
FIG. 2 is a perspective view of the preferred embodiment of the present invention.

Referring to FIGS. 1–4, a push—push card connector 10 is comprised of a terminal connector 11, a cover shell 21, a slidable frame 31, an injecting/ejecting means 41, and an elastic member 51.

The terminal connector 11 includes a plurality of contact pins 12 for being electrically connected with corresponding terminals (not shown) of an inserted card 99, corresponding to a rear end of the cover shell 21.

The cover shell 21 includes a lateral guide channel 22 formed at a side thereof, a first guide channel 23 formed at a front section of an opposite side thereof, a second guide channel 24 formed at a rear section of the opposite side thereof, two retaining pieces 28 extending bilaterally from a front side thereof, and a pin 29 provided at the rear end thereof and abutting the second guide channel 24. The distance between the lateral guide channel 22 and the first guide channel 23 is larger than that between the lateral guide channel 22 and the second guide channel 24.

The slidable frame 31 includes a lateral guide member 32 located at a side thereof and slidably received in the lateral guide channel 22, a first guide member 33 located at an opposite side thereof and slidably received in the first guide channels 23, a second guide member 34 slidably received in the second guide channel 24, and two action pieces 38 extending respectively from distal ends of the lateral guide member 32 and the second guide member 34 for contacting and pushing by the card 99 to further move toward the rear end of the cover shell 21. The first and second guide members 33 and 34 are formed in one piece. The slidable frame 31 can be driven by an external force to slidably move via the lateral, first, and second guide members 32, 33, and 34 along the lateral, first, and second guide channels 22, 23, and 24. A receiving chamber 26 is defined between the cover shell 21 and the slidable frame 31 for inserting and receiving the card 99 therein. The second guide member 34 has a recession 341 for receiving the elastic member 51.

The injecting/ejecting means 41 includes a heart-shaped guide slot 42 and a positioning member 44. The guide slot 42 is located at an external side of the lateral guide member 32, defining a first stop point 421 and a second stop point 422. The cover shell 21 further has a hole 221 running through a sidewall of the cover shell 21 and communicating with the lateral guide channel 22. The positioning member 44 is mounted at an external side of the cover shell 21, having two ends respectively mounted to the sidewall of the lateral guide channel 22 for pivotal movement and inserted through the hole 221 to be located in the guide slot 42. The cover shell 21 further includes a springy fender 222 formed on the sidewall thereof and partially surrounded by the hole 221 for refraining the positioning member 44 from moving out of the cover shell 21. Since the guide slot 42 is structurally well known in the prior art, no further recitation is necessary.

The elastic member 51, which is embodied as a compression spring, is received in the recession 341 of the second guide member 34. The elastic member 51 has two ends respectively fitted onto the pin 29 and contacting against an end of an inner periphery of the recession 341 for generating resilience, which enables the slidable frame 31 to elastically move outwards.

Figure 3:
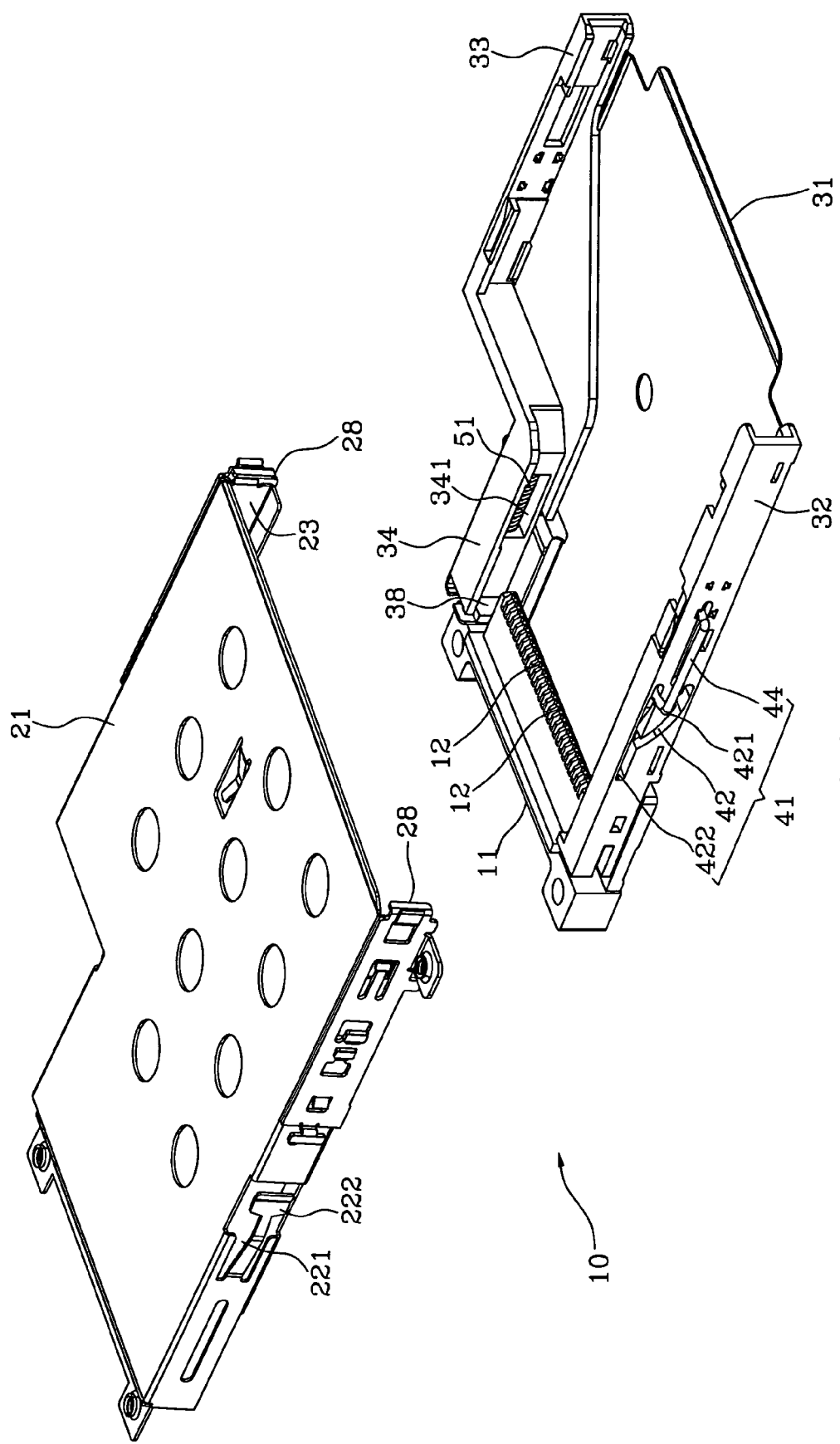
FIG. 3 is a partial exploded view of the preferred embodiment of the present invention.
Figure 4:
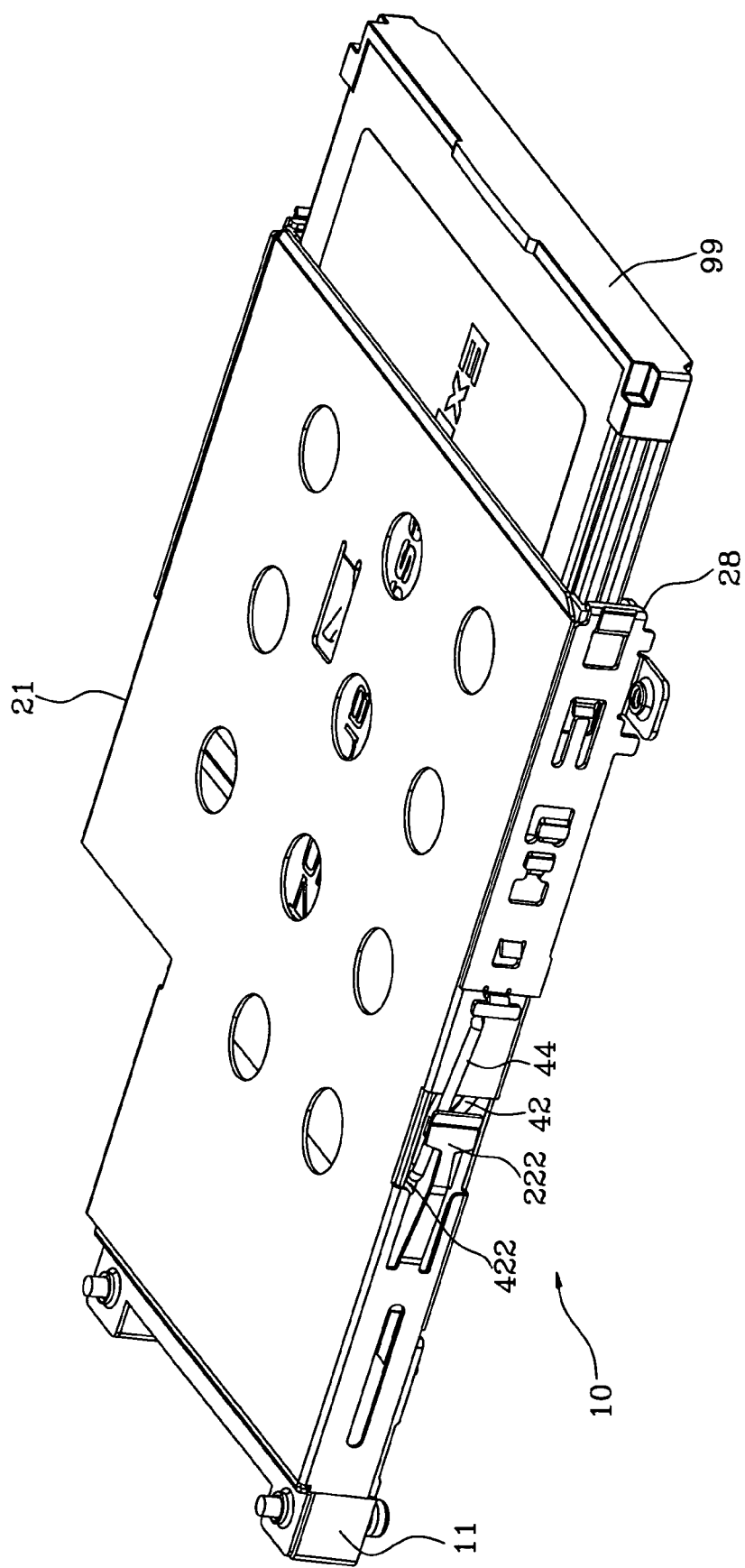
FIG. 4 is a schematic view of the preferred embodiment of the present invention, showing that a card is injected.

Referring to FIGS. 3–4, before the card 99 is inserted into the card connector 10, the slidable frame 31 is located relatively at a front section of the cover shell 21. After the card 99 is inserted into the card connector 10, the card 99 contacts against the action pieces 38 and further pushes the slidable frame 31 to slidably move toward the rear end of the cover shell 21. The lateral, first, and second guide members 32, 33, and 34 are guided by the lateral, first, and second guide channels 22, 23, and 24 to enable the slidable frame 31 to stably move without deflection. In the meantime, the elastic member 51 is compressed by the backward movement of the slidable frame 31 to generate the resilience potentially for pushing the slidable frame 31 outwards. While the card 99 is pushed inwards to enable its corresponding terminals (not shown) to be electrically connected with the terminal connector 11, the heart-shaped slot 42 is moved together with the slidable frame 31 to securely position the positioning member 44 at the first stop point 421.

Figure 5:
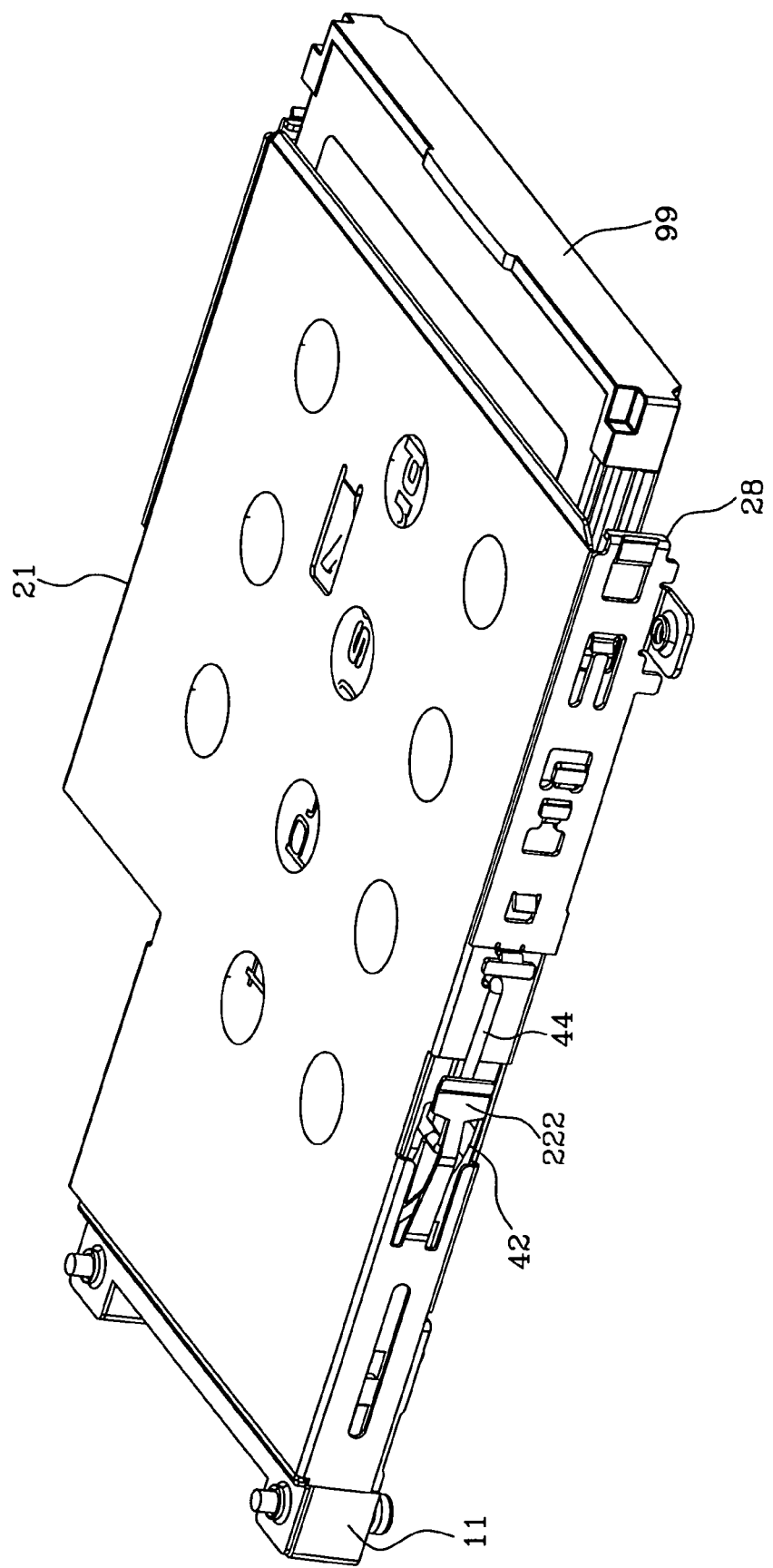
FIG. 5 is a schematic view of the preferred embodiment of the present invention, showing that a card is ejected.

Referring FIGS. 3 and 5, while ejecting the card 99, the user can push the card 99 further inwards to disengage the positioning member 44 from the first stop point 421, and then the resilience of the elastic member 51 works on the second guide member 34 to push the slidable frame 31 and the card 99 outwards; meanwhile, the guide slot 42 is moved together with the slidable frame 31 to securely position the positioning member 44 at the second stop point 422, such that the card 99 is ejected for extraction. The two retaining pieces 28 of the cover shell 21 keep the lateral guide member 32 and the first guide member 33 in the receiving space 26 and refrain the slidable frame 31 from being pushed out of the receiving space 26.

Figure 6:
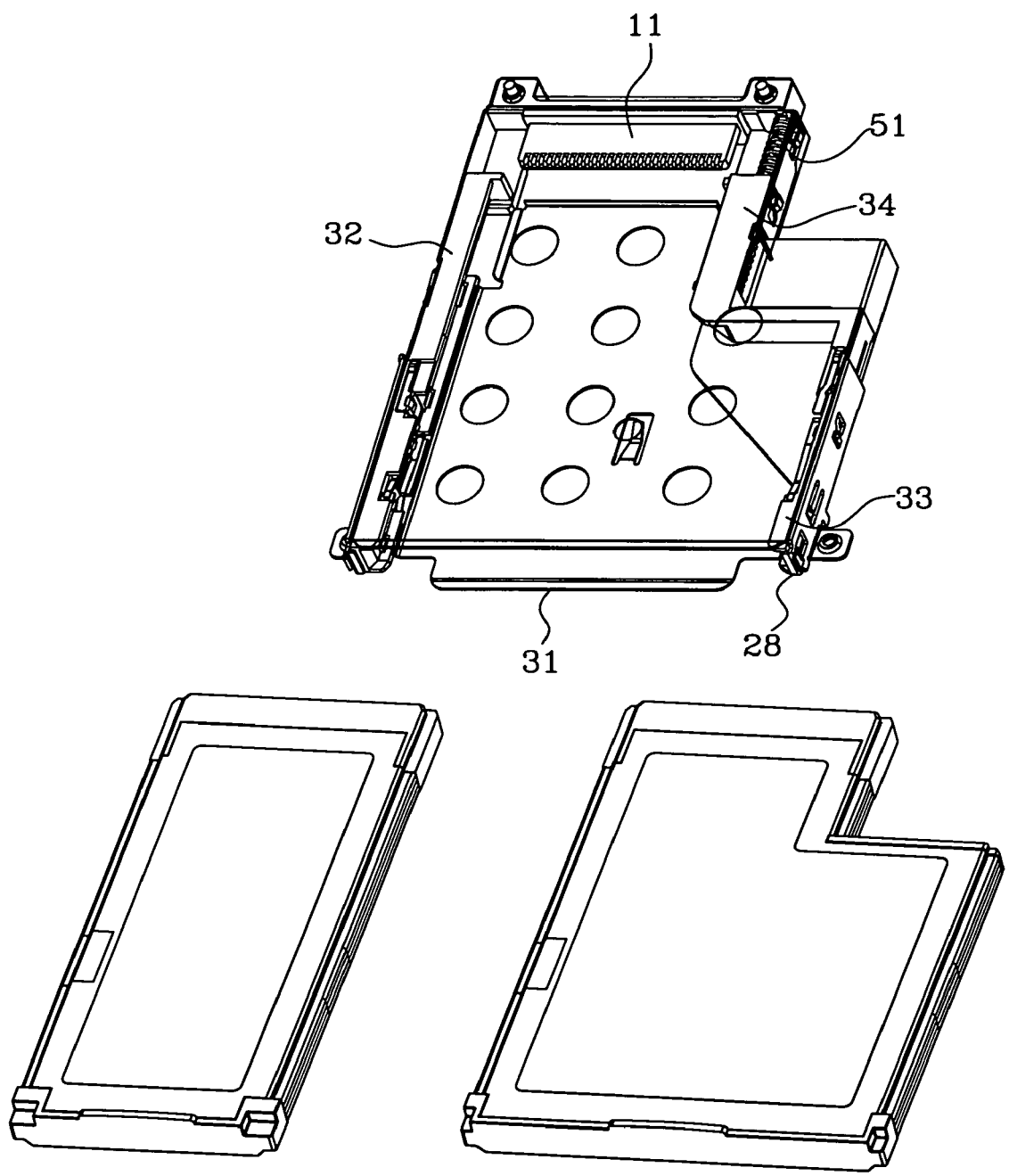
FIG. 6 is a schematic view of the preferred embodiment of the present invention compatible with two different electronic cards.

From the above recitation, the slidable frame 31 is pushed inwards and outwards together with the injection and ejection of the card 99 totally by the interaction between the elastic member 51 and the second guide member 34. As shown in FIG. 6, since the distance between the lateral and second guide members 32 and 34 is smaller than that between the lateral and first guide members 32 and 33, the second guide member 34 is closer to an imaginary middle line, which extends through the front and rear ends and the center of the slidable frame 31, than the first guide member 33.

The resilience of elastic member 51 works on the imaginary middle line of the slidable frame 31 other than the lateral side of the card 99 as the conventional injecting/ejecting means does. Thus, the slidable frame 31 can much balancedly push the card 99 or the slidable frame 31 not to deflect the card 99 or the slidable frame 31 but facilitate smooth operation. In other words, the present invention eliminates the problem of deflection that may happen on the conventional card connector, into which a relatively broader card is inserted.

In addition, the present invention is compatible with more than one electronic card, which can be properly injected and ejected.

What is claimed is:

1. A push—push card connector capable of injecting/ejecting a card, comprising:
   a terminal connector having a plurality of contact pins;
   a cover shell having a lateral guide channel formed at a side, a first guide channel formed at a front section of an opposite side thereof, and a second guide channel formed at a rear section of the opposite side thereof, the distance between said lateral guide channel and said first guide channel being larger than that between said lateral guide channel and said second guide channel, said cover shell having a rear end connected with said terminal connector;
   a slidable frame having a lateral guide member slidably received in said lateral guide channel, a first guide member slidably received in said first guide channel, a second guide member slidably received in said second guide channel, and at least one action piece provided at a rear end thereof for pushing by an inserted card to slidably move toward the rear end of said cover shell, for slidable movement along said guide channels by an external force, a receiving space being defined between said slidable frame and said cover shell for inserting and receiving a card therein;
   an injecting/ejecting means having a heart-shaped guide slot and a positioning member, said guide slot being formed on one of said guide members of said slidable frame, said positioning member having two ends respectively mounted to one of said guide channels of said cover shell and located in said guide slot; and
   an elastic member having two ends respectively mounted to said cover shell and said second guide member for generating resilience that ejects said slidable frame.

2. The card connector as defined in claim 1, wherein said cover shell comprises two retaining pieces bilaterally provided at a front end thereof.

3. The card connector as defined in claim 1, wherein said cover shell comprises a pin provided at a rear end thereof corresponding to said second guide channel; said second guide member comprises a recession for receiving said elastic member; said elastic member is a compression spring having two ends respectively fitted onto said pin and contacting against an inner periphery of said recession.

4. The card connector as defined in claim 1, wherein said first guide member and said second guide member are formed in one piece.

5. The card connector as defined in claim 1, wherein said at least action piece of said slidable frame extends sidewards from a distal end of said second guide member.

6. The card connector as defined in claim 1, wherein said heart-shaped guide slot is located at an external side of said lateral guide member and comprises a hole running through a sidewall of said cover shell and communicating with said guide slot; said positioning member is located at an external side of said cover shell, comprising the two ends respectively located at the sidewall of said cover shell abutting said guide slot and inserted through said hole to be located in said guide slot; said cover shell further comprises a springy fender formed at the sidewall for confining movement of said positioning member.

* * * * *